US012796626B2

(12) United States Patent
Curtis

(10) Patent No.: US 12,796,626 B2
(45) Date of Patent: Nov. 17, 2026

(54) PLANT CONTAINER FOR VERTICAL GARDEN

(71) Applicant: Christopher Lee Curtis, St. George (CA)

(72) Inventor: Christopher Lee Curtis, St. George (CA)

(*) Notice: Subject to any disclaimer, the term of this patent is extended or adjusted under 35 U.S.C. 154(b) by 0 days.

(21) Appl. No.: 18/166,647

(22) Filed: Feb. 9, 2023

(65) Prior Publication Data

US 2024/0268281 A1 Aug. 15, 2024

(51) Int. Cl.
*A01G 9/24* (2006.01)
*A01G 27/00* (2006.01)

(52) U.S. Cl.
CPC ............. *A01G 9/247* (2013.01); *A01G 27/00* (2013.01)

(58) Field of Classification Search
CPC ........ A01G 9/025; A01G 9/247; A01G 27/02; A01G 27/008
See application file for complete search history.

(56) References Cited

U.S. PATENT DOCUMENTS 2,809,468 A * 10/1957 Sol ........................ A01G 27/006 47/79
3,739,524 A * 6/1973 Rose ...................... A01G 27/04 47/81
4,001,967 A * 1/1977 Swift ..................... A01G 27/02 47/80
4,916,858 A * 4/1990 Hobson .................. A01G 27/04 47/81
6,848,483 B1 * 2/2005 Atkinson ............... A01G 27/02 141/95
8,146,292 B2 * 4/2012 Brandstatter .......... A01G 27/02 47/79
8,973,301 B2 * 3/2015 Leung .................... A01G 29/00 47/65.5
2016/0330919 A1 * 11/2016 Choate ................... A01G 27/04
2021/0282336 A1 * 9/2021 Kupferschmidt ...... A01G 9/247

FOREIGN PATENT DOCUMENTS

EP 3597034 A1 * 1/2020 ............. A01G 27/02
FR 2724813 A1 * 3/1996 ............. A01G 27/02
WO WO-2012104512 A1 * 8/2012 ........... A01G 27/006

* cited by examiner

*Primary Examiner* — Joshua D Huson
*Assistant Examiner* — Alanna K Peterson
(74) *Attorney, Agent, or Firm* — Renner, Kenner, Greive, Bobak, Taylor & Weber

(57) ABSTRACT

A plant container for a vertical garden includes: a container body including at least one wall and a floor; and an irrigation dispenser suspended from an upper edge of the at least one wall. The irrigation dispenser and the at least one wall define an enclosure sized to accommodate a volume of irrigation fluid, the irrigation dispenser having a bottommost surface spaced above the floor of the container body.

14 Claims, 11 Drawing Sheets

PLANT CONTAINER FOR VERTICAL GARDEN

FIELD

The present invention relates generally to vertical gardens and in particular, to a plant container for a vertical garden.

BACKGROUND

In the field of gardening, vertical gardens (sometimes referred to as "green walls" or "living walls") consist of an array of plant containers supported on a vertical support surface, such as a wall. Each plant container holds a growth medium (e.g. soil) and one or more plants. As the plants grow and reach maturity, their foliage spreads to cover the containers and at least a portion of the support surface, and thereby creates a unique and visually pleasing appearance that brings aesthetic and health benefits to people in their vicinity.

Achieving proper irrigation of a vertical garden can be challenging. Overwatering the plants can result in mold formation and plant disease, while underwatering the plants can result in desiccation and death of the plants.

To facilitate irrigation, plant containers for vertical gardens often include an irrigation apparatus positioned in proximity with the plant.

Plant containers for vertical gardens that include irrigation apparatuses have been described. For example, German Patent Document No. 9102347U1 to Plantor AMA PTY LTD. describes an apparatus for supporting and displaying plants that includes a plurality of plant containers attached to a vertical wall surface or the like, comprising a flow line extending into each plant container for supplying water to the plant container. A drain is arranged in a bottom of the plant container below an inflow conduit, with the drain projecting at a defined height from the bottom of the plant container into the interior thereof and having at its upper part outer peripheral openings that are spaced a certain distance from the bottom of the plant container in order to achieve a certain standing height of outflowing water. The drain is connected to the inflow conduit of the next plant container beneath.

French Patent Document No. 2664791 to Bouillard describes a water tank that supplies, by means of a suitable water flow, for example dropwise, a storage container for the periodic supply of water to plants therein. The water is distributed with the aid of a syphon mechanism. The water storage container is buried in the plant substrate (for example, soil), in such a way that irrigation of the plants by the syphon mechanism is effected directly within the culture medium every time the water reserve has reached a certain level in its container and empties itself with the aid of the syphon mechanism.

U.S. Patent Application Publication No. 2022/0264807 to Dziedzic generally describes a plant container for greening walls that has a main body defining a chamber to receive a growth medium for a plant. A draining pipe is coupled with the main body, extends along a back wall of the main body and has a top end, a bottom end and an opening in a wall of the draining pipe to allow water from inside the chamber to enter inside the draining pipe. The opening in the wall of the draining pipe extends from a bottom wall of the main body. A connecting conduit is configured to connect the bottom end of the draining pipe with a top end of the draining pipe of another plant container of the same type. A through hole extends along the whole length of the draining pipe.

Improvements are generally desired. It is therefore an object at least to provide a novel plant container for a vertical garden.

SUMMARY

In one aspect, there is provided a plant container for a vertical garden, the plant container comprising: a container body comprising at least one wall and a floor; and an irrigation dispenser suspended from an upper edge of the at least one wall, the irrigation dispenser and the at least one wall defining an enclosure sized to accommodate a volume of irrigation fluid, the irrigation dispenser having a bottommost surface spaced above the floor of the container body.

The bottommost surface of the irrigation dispenser may define a perimeter of a discharge opening of the irrigation dispenser.

The irrigation dispenser may comprise a hooked tab configured to engage the at least one wall. The hooked tab may define a channel along its length, the channel being sized to matingly receive the upper edge of the at least one wall.

The irrigation dispenser may comprise a connecting feature at an upper end thereof, the connecting feature being in fluid communication with the enclosure. The connecting feature may be configured to connect to a conduit for delivery of irrigation fluid to the irrigation dispenser. The connecting feature may be a nipple having a fluid passage formed therein. The connecting feature may be a receptacle sized to matingly receive an end of a conduit for delivery of irrigation fluid to the irrigation dispenser.

In another aspect, there is provided a plant container for a vertical garden, the irrigation dispenser comprising: a front wall; a central, elongate rib projecting forwardly from the front wall; and a first tapered side wall and a second tapered side wall each projecting rearwardly from a respective edge of the front wall, the front wall, the central, elongate rib and the first and second tapered side walls defining a portion of an enclosure configured to accommodate irrigation fluid.

The irrigation dispenser may have a bottommost surface defining a perimeter of a discharge opening.

The irrigation dispenser may further comprise a hooked tab defining a channel along its length. The channel may be sized to matingly receive an upper edge of a wall of the plant container.

The irrigation dispenser may further comprise a connecting feature at an upper end of the irrigation dispenser, the connecting feature being in fluid communication with the portion of the enclosure. The connecting feature may be configured to connect to a conduit for delivery of irrigation fluid to the irrigation dispenser. The connecting feature may be a nipple having a fluid passage formed therein. The connecting feature may be a receptacle sized to matingly receive an end of a conduit for delivery of irrigation fluid to the irrigation dispenser.

BRIEF DESCRIPTION OF THE DRAWINGS

Embodiments will now be described more fully with reference to the accompanying drawings in which.

DETAILED DESCRIPTION OF ILLUSTRATIVE EMBODIMENTS

Figure 1:
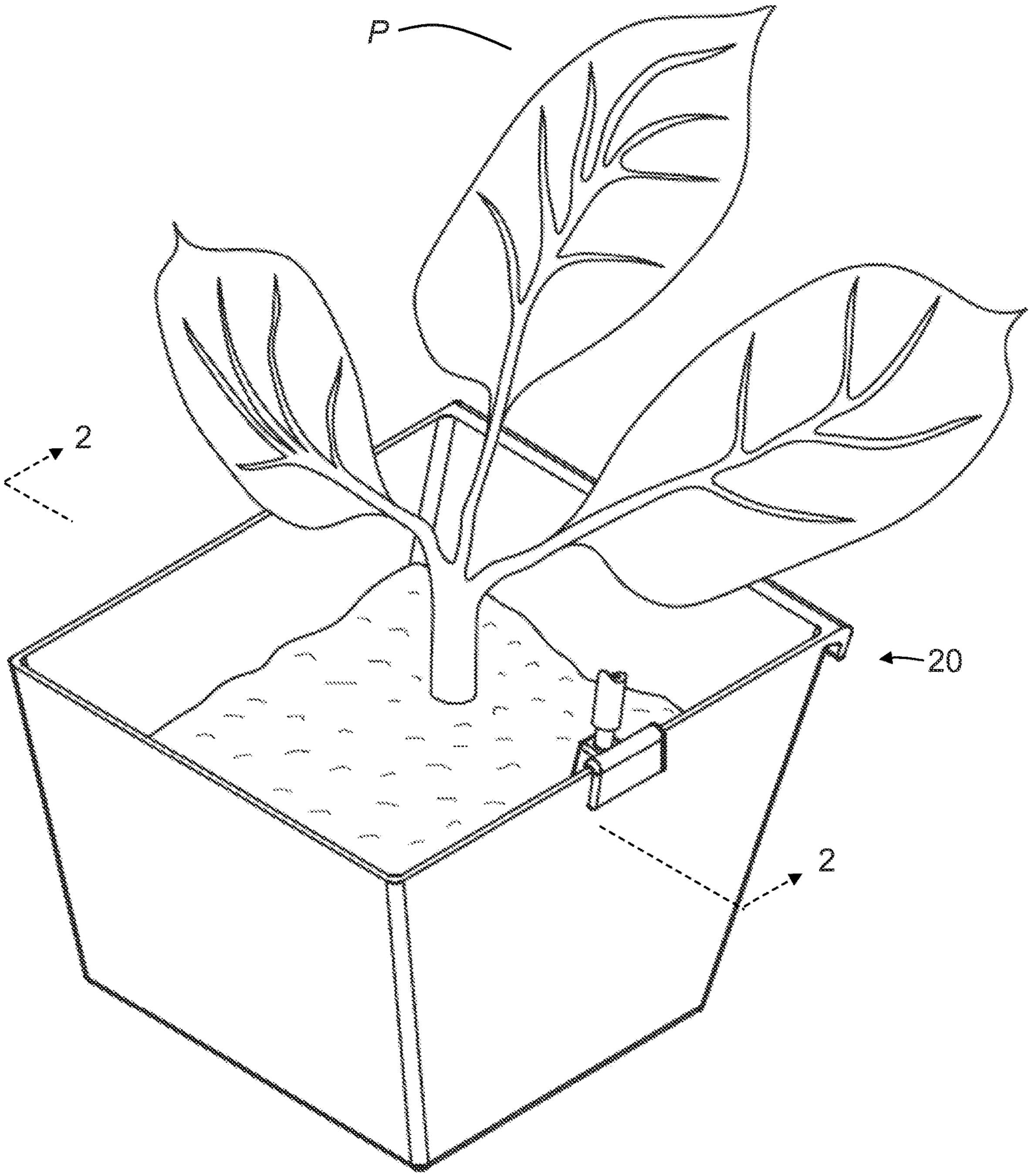
FIG. 1 is a perspective view of a plant container for a vertical garden, containing a plant growing therein, in use.

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of description to describe the relationship of an element or feature to another element or feature as illustrated in the drawings. The spatially relative terms can however, encompass different orientations in use or operation in addition to the orientation depicted in the drawings.

Figure 2:
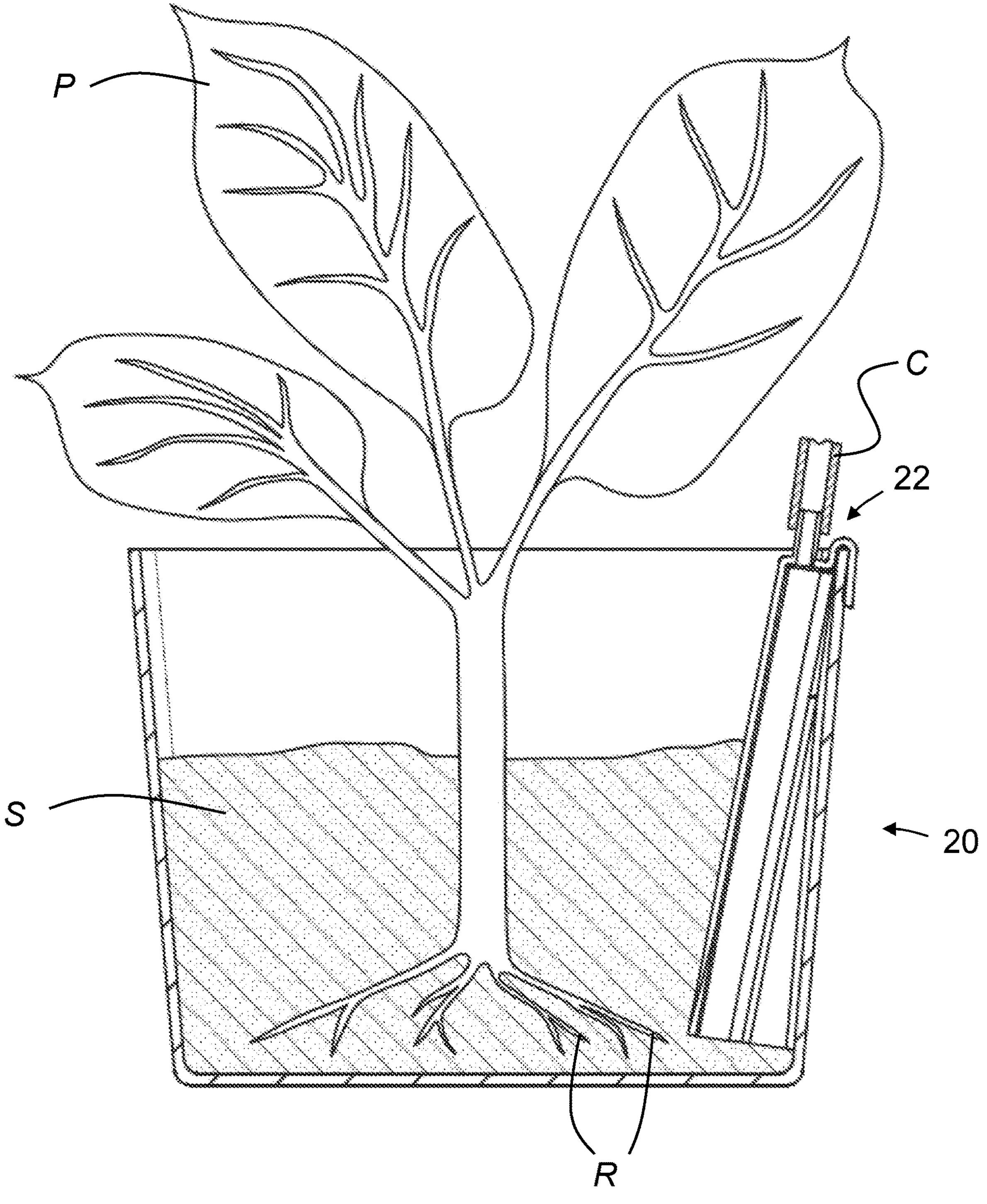
FIG. 2 is a sectional view of the plant container and the plant of FIG. 1, in use, taken along the indicated section line.
Figure 3:
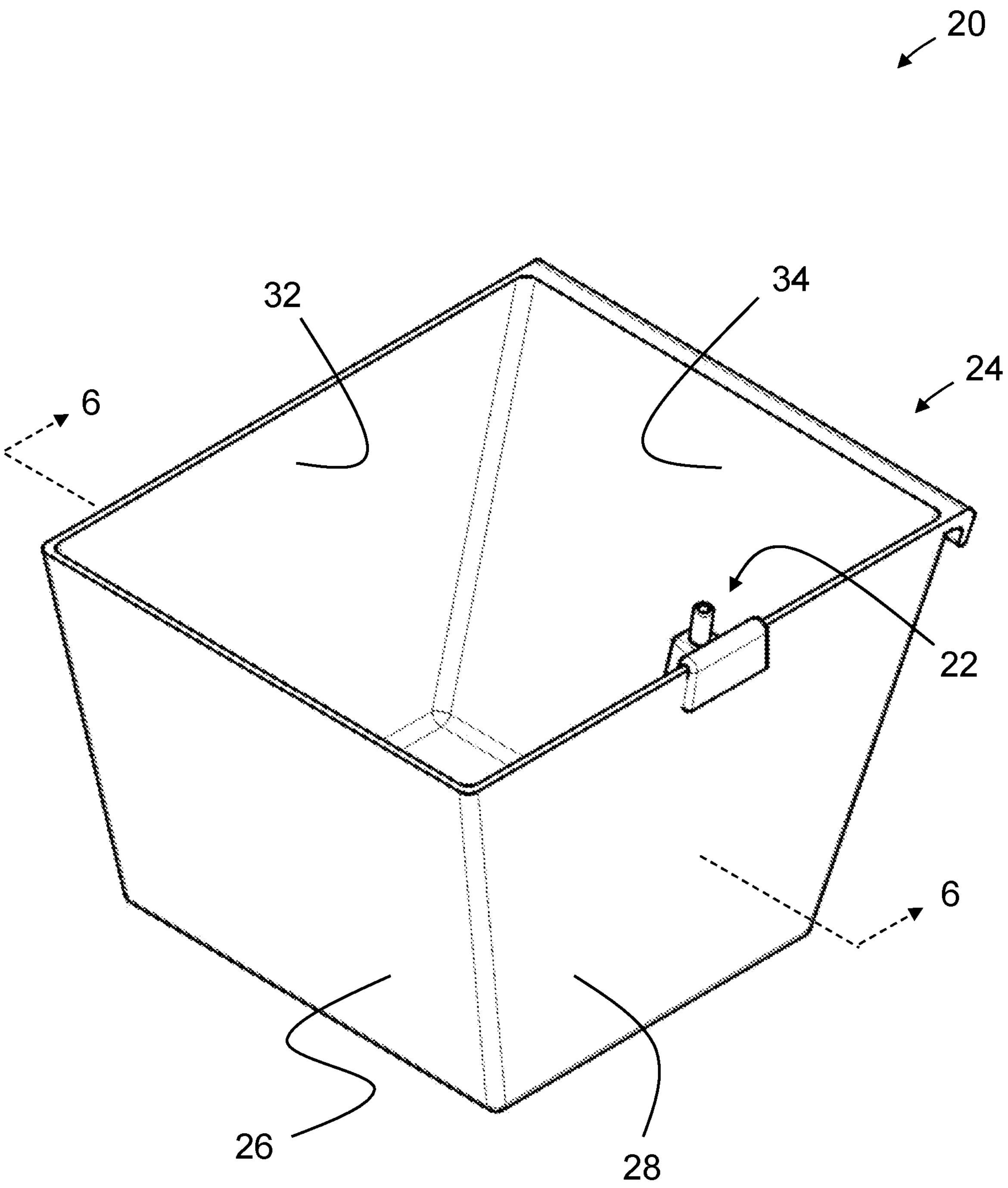
FIG. 3 is a perspective view of the plant container of FIG. 1.
Figure 4:
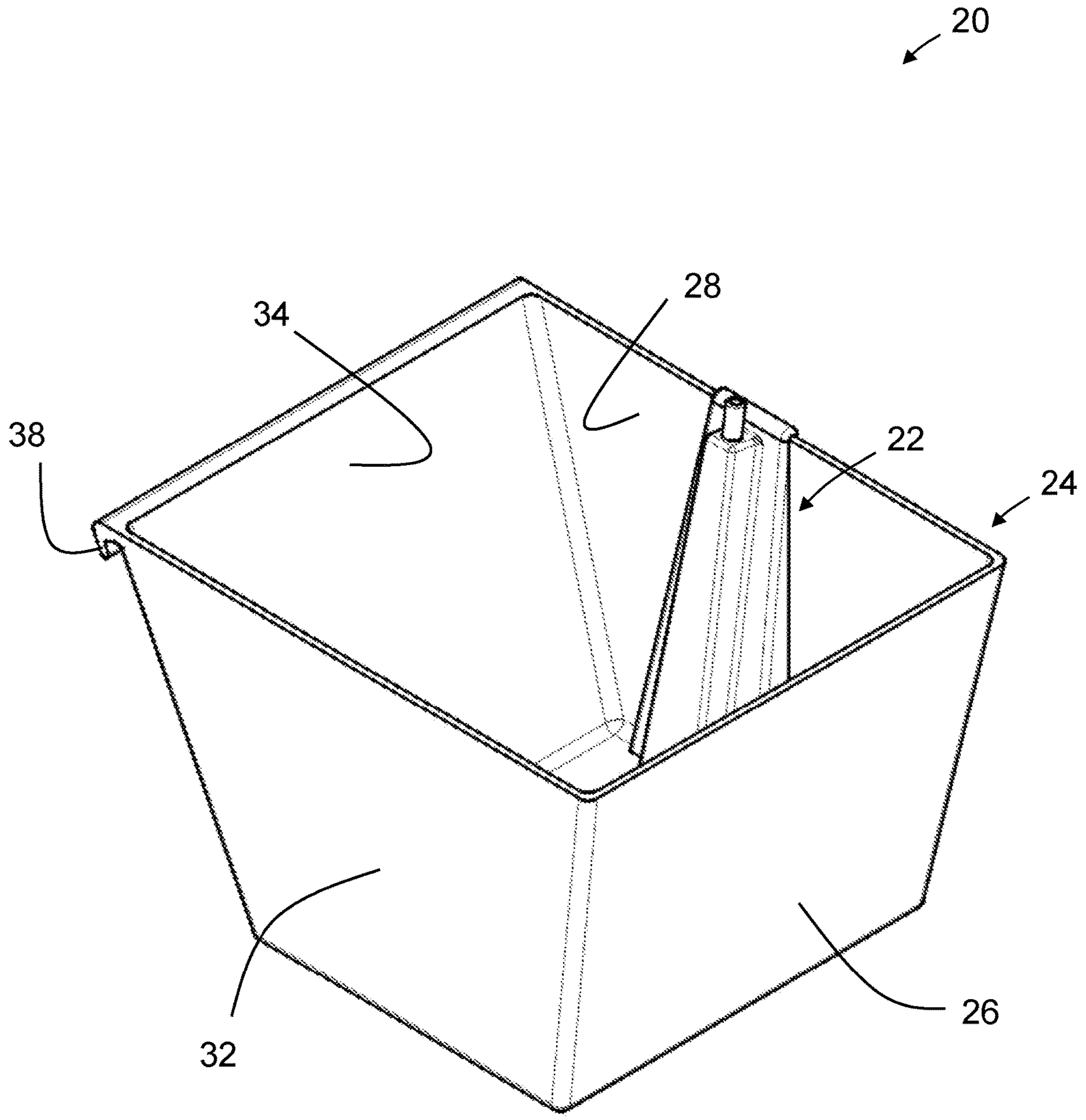
FIG. 4 is another perspective view of the plant container of FIG. 1.
Figure 5:
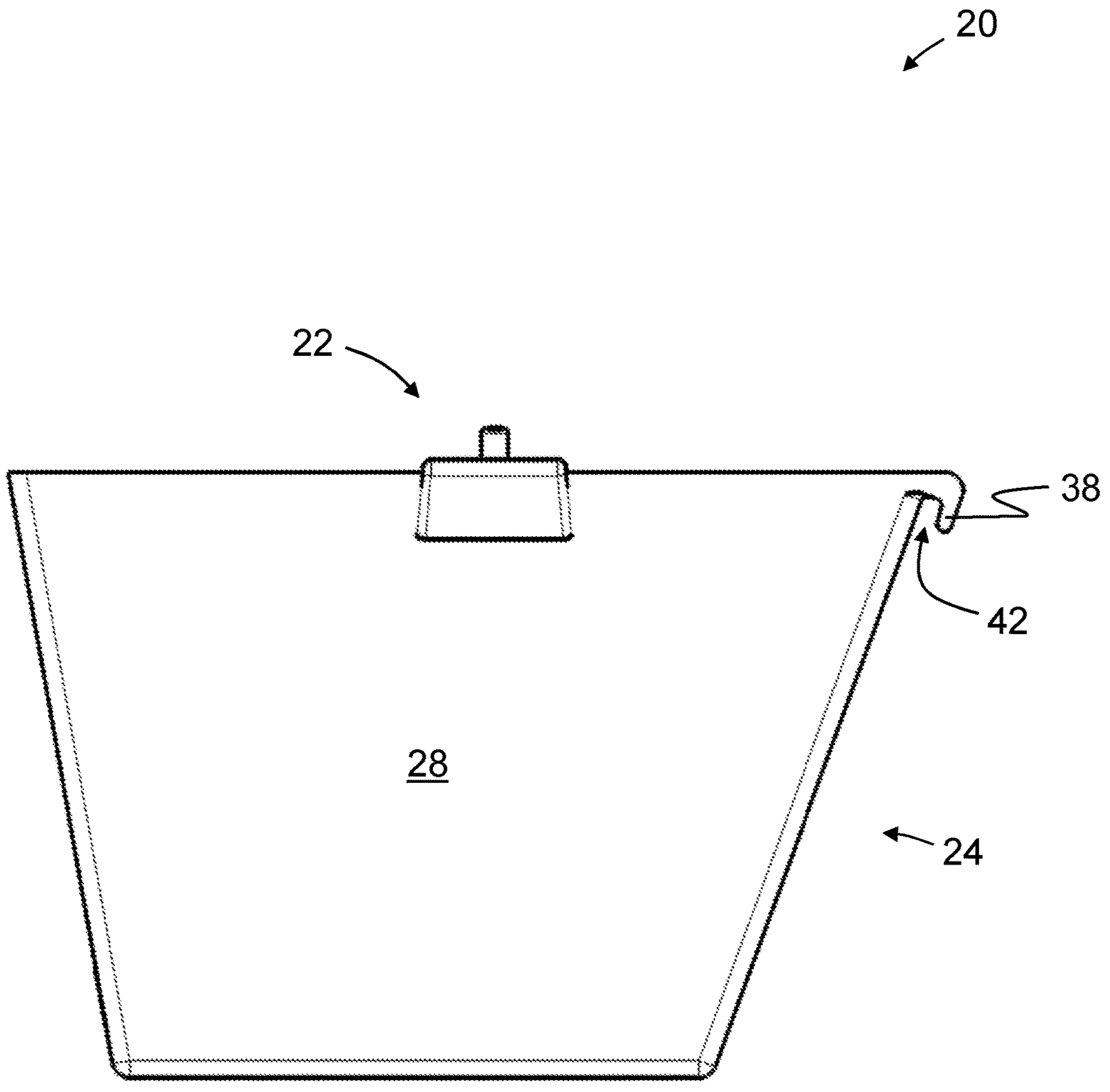
FIG. 5 is a side view of the plant container of FIG. 3.

Turning now to the drawings, FIGS. 1 and 2 show a plant container for a vertical garden, in use, with the plant container being generally indicated by reference numeral 20. Plant container 20 is configured to form part of a vertical garden (not shown) comprising a plurality of the plant containers 20. Each plant container 20 is configured to be supported on a vertical support surface (not shown) such as a wall, with each plant container 20 containing a quantity of growth medium, such as soil S, and one or more plants P growing therein. Each plant container 20 comprises an irrigation dispenser 22 that is configured to convey a measured amount of irrigation fluid, such as water or a water-fertilizer solution, to root tips R of the one or more plants P growing therein.

The plant container 20 may be better seen in FIGS. 3 to 12. The plant container 20 comprises a container body 24 on which the irrigation dispenser 22 is disposed. The container body 24 is generally in the form of an open vessel, and in this embodiment the container body 24 comprises four (4) walls, namely a front wall 26, a first side wall 28, a second side wall 32 and a rear wall 34, and a floor 36. The container body 24 also comprises a support feature extending from the rear wall 34, for enabling the container body 24 to engage the vertical support surface so that the plant container 20 can be supported. In the example shown, the support feature is in the form of a longitudinal angled tab 38 that extends the length of the rear wall 34. The longitudinal angled tab 38 defines a channel 42 along its length, which is sized to matingly receive a corresponding vertical support feature (not shown) of the vertical support surface. The corresponding vertical support feature may be, for example, a complementarily shaped support bracket (not shown) mounted on the wall (or other vertical support surface) having one or more tabs or projections sized to matingly engage the channel 42.

In the example shown, the container body 24 is fabricated from a single piece of material, and in this embodiment the container body 24 is fabricated from a single piece of polyurethane plastic by injection molding.

The irrigation dispenser 22 may be better seen in FIGS. 8 to 12. The irrigation dispenser 22 has an elongate, tapered shape that is sized to extend nearly the height, h, of each of the side walls 28 and 32 of the container body 24. In the example shown, the irrigation dispenser 22 has a front wall 52 having a central, elongate rib 54 projecting forwardly therefrom, a first tapered side wall 56 and a second tapered side wall 58 each projecting rearwardly from a respective edge of the front wall 52, and a hooked tab 62 extending rearwardly from an upper edge of the front wall 52. As will be understood, the elongate rib 54 is shaped to provide structural support to the irrigation dispenser 22 against pressure applied by the soil S, while providing a cavity for accommodating irrigation fluid. The hooked tab 62 defines a channel 64 along its length, which is sized to matingly receive an upper edge of one of the side walls 28 and 32 of the container body 24 to enable the irrigation dispenser 22 to be suspended thereon. The irrigation dispenser 22 also has a hollow, upwardly extending nipple 66 formed at an upper end thereof. The nipple 66 has a fluid passage 68 formed therethrough. The nipple 66 is configured to be connected to a conduit C, which in the example shown is a flexible hose, for delivery of irrigation fluid (not shown) to the irrigation dispenser 22, during use. In this embodiment, the nipple 66 has an outer diameter that is slightly larger than an inner diameter of the conduit C for providing an interference fit between the conduit C and the nipple 66. The irrigation dispenser 22 also has a discharge opening 70 defined at a lower end thereof, through which irrigation fluid can flow into the interior of the container body 24, during use. A bottommost surface of the irrigation dispenser 22 defines a perimeter of the discharge opening 70. As will be understood, due to the generally triangular shape of each of the first and second tapered side walls 56 and 58, and due to the existence of the elongate rib 54, the area of the discharge opening 70 is large relative to the size of the irrigation dispenser 22, which advantageously prevents clogging of the discharge opening 70, such as by soil S, during use.

In the example shown, the irrigation dispenser 22 is fabricated from a single piece of material, and in this embodiment the container body 24 is fabricated from a single piece of polyurethane plastic by injection molding.

Figure 6:
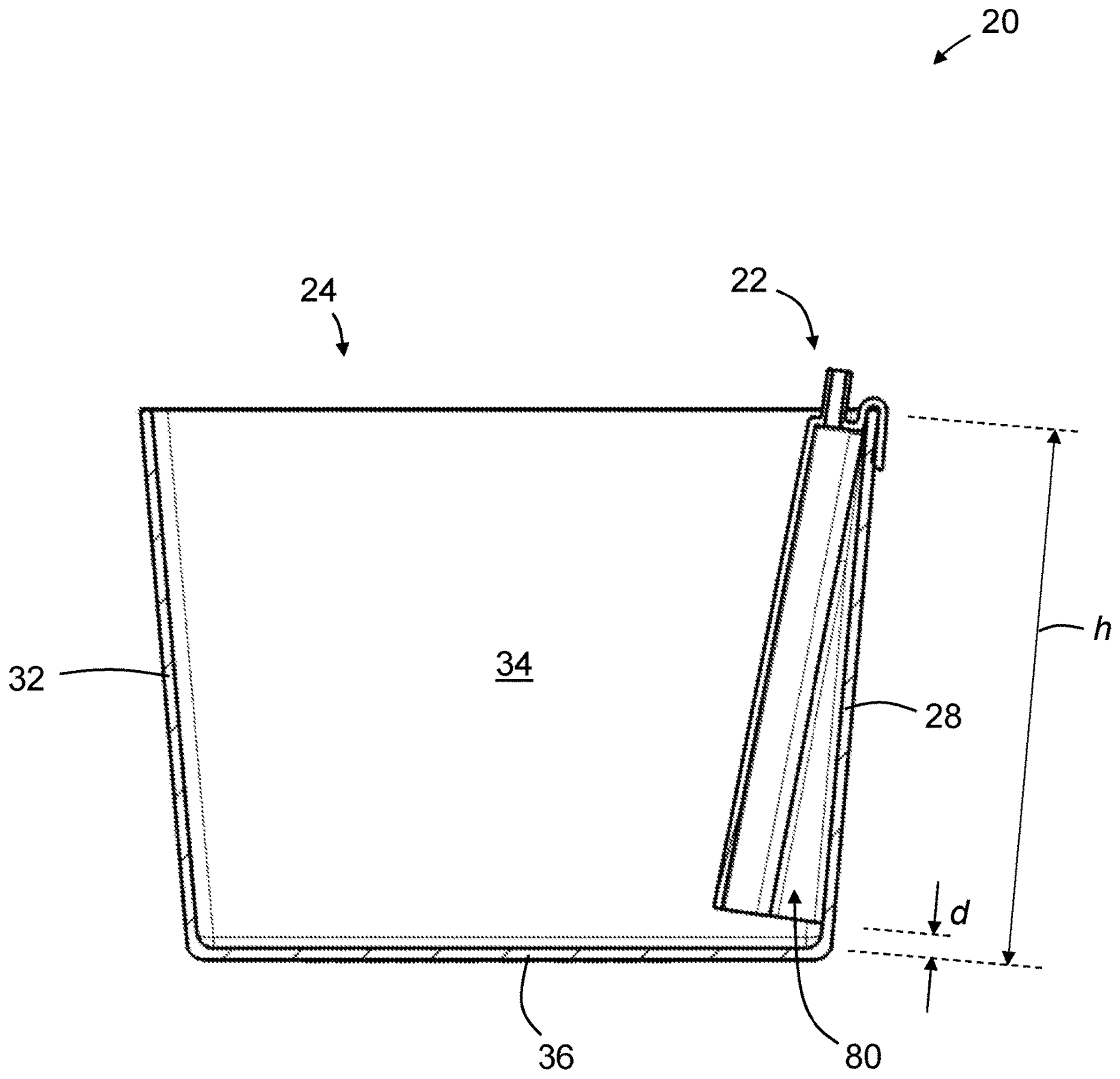
FIG. 6 is a sectional view of the plant container of FIG. 4, taken along the indicated section line.
Figure 7:
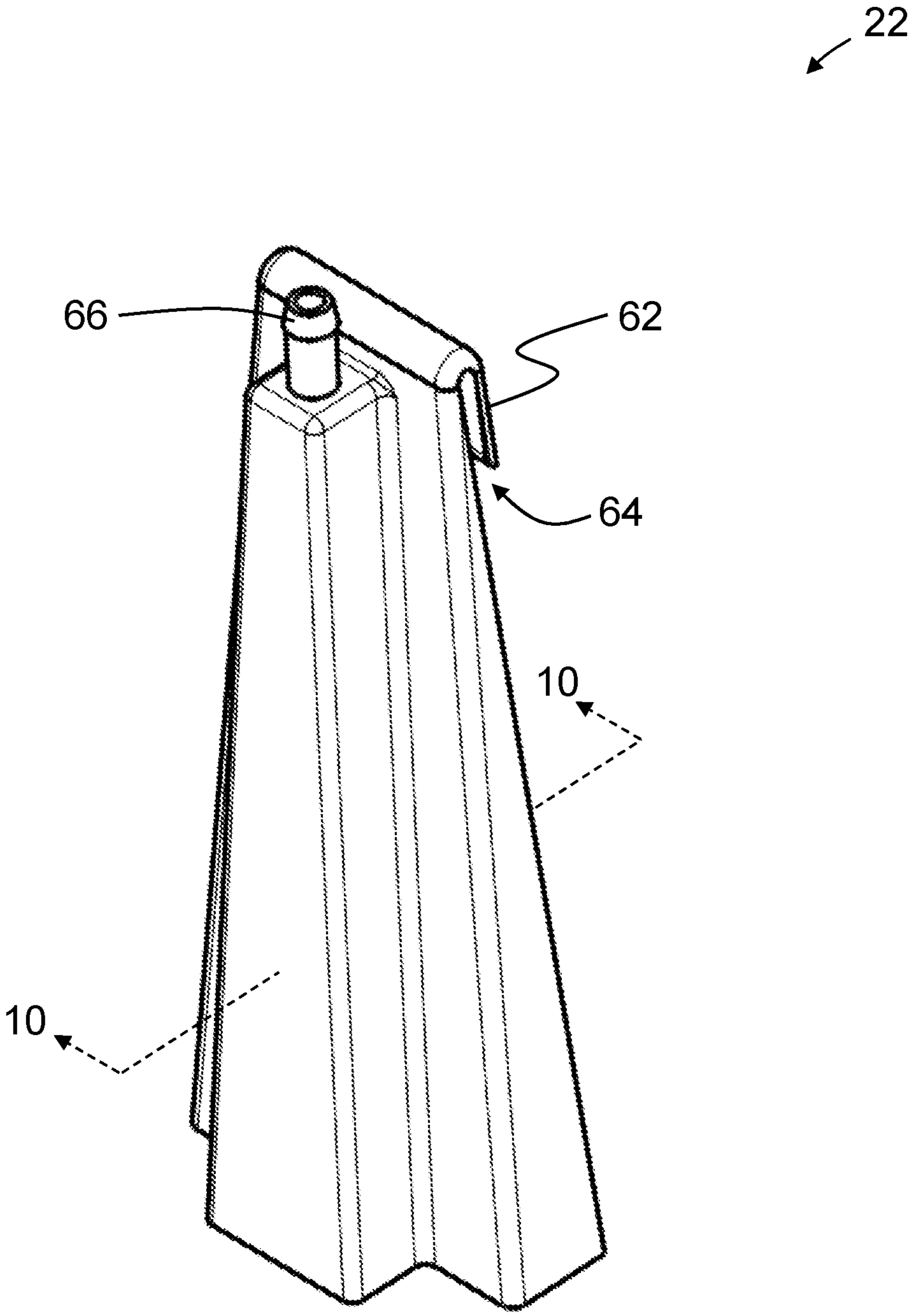
FIG. 7 is a perspective view of an irrigation dispenser forming part of the plant container of FIG. 3.
Figure 8:
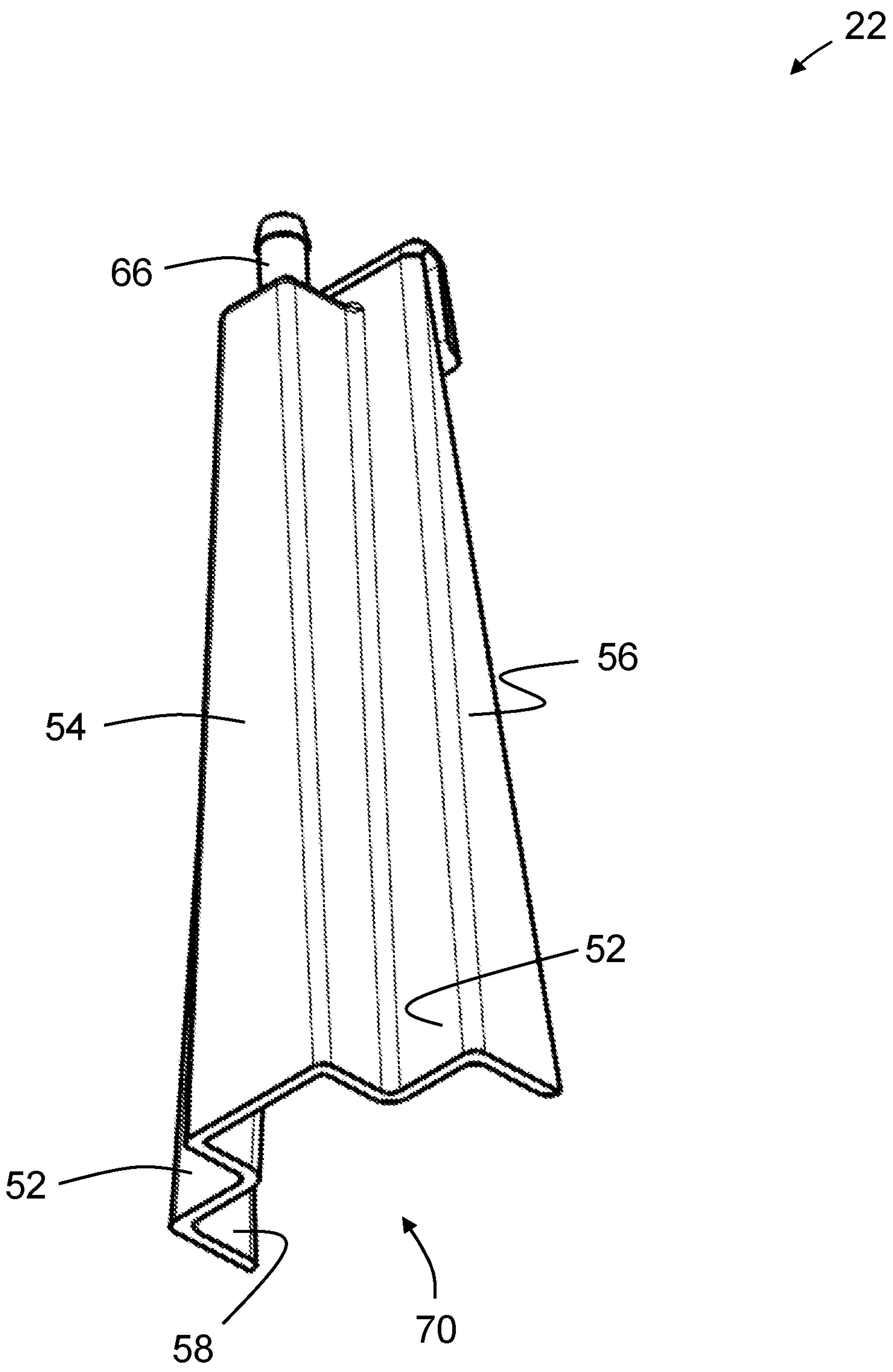
FIG. 8 is another perspective view of the irrigation dispenser of FIG. 7.
Figure 9:
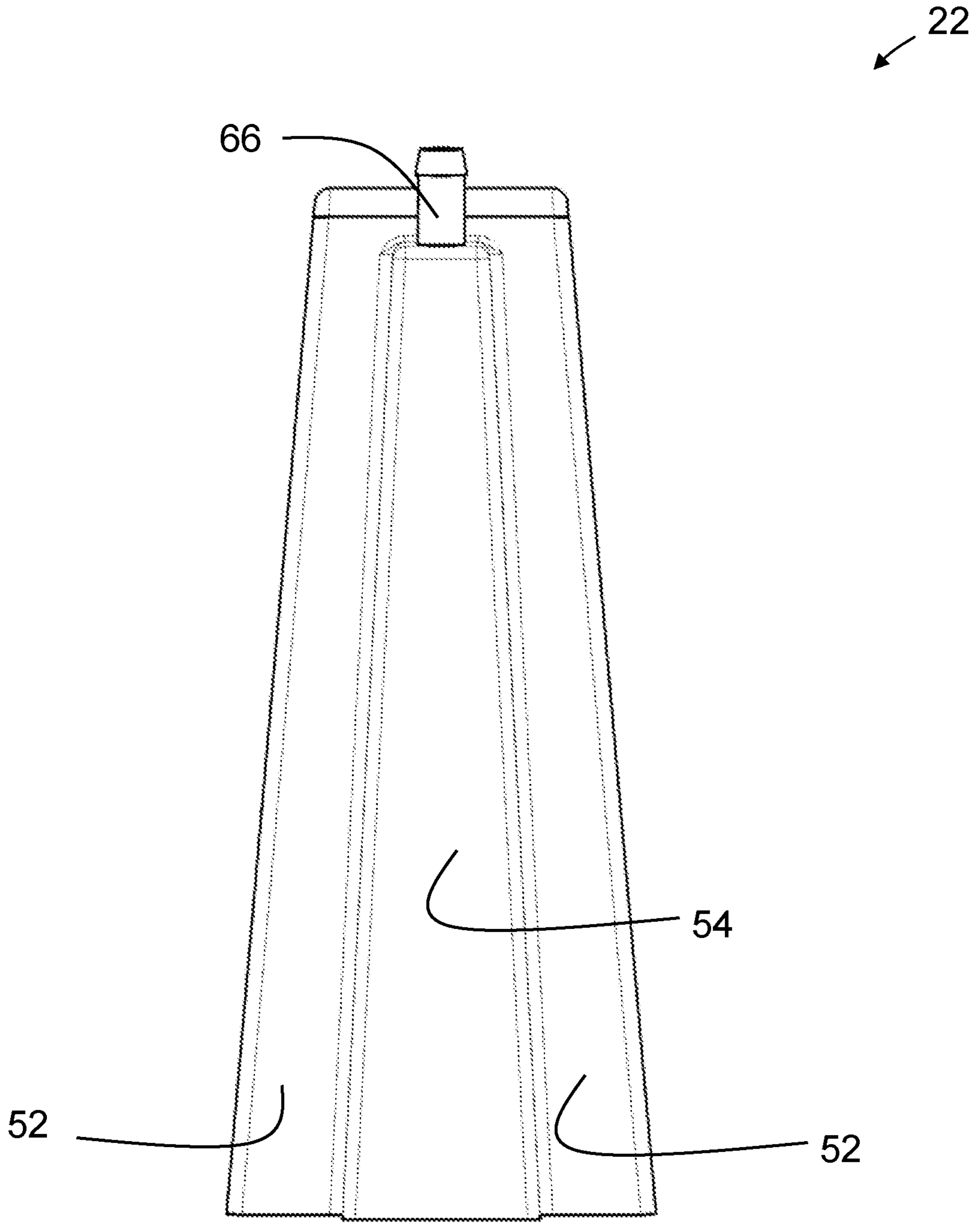
FIG. 9 is a front view of the irrigation dispenser of FIG. 7.
Figure 10:
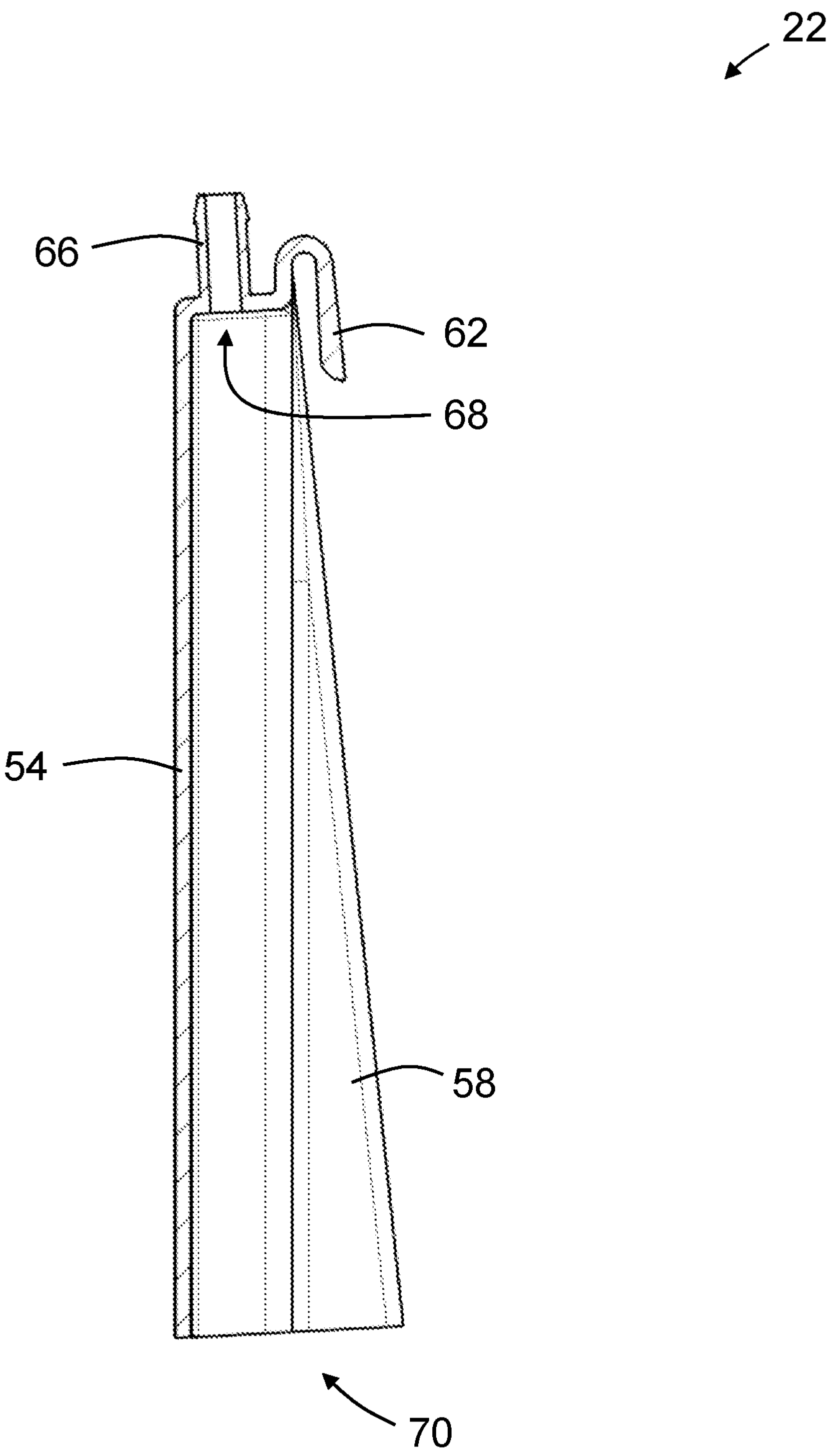
FIG. 10 is a sectional view of the irrigation dispenser of FIG. 7, taken along the indicated section line.
Figure 11:
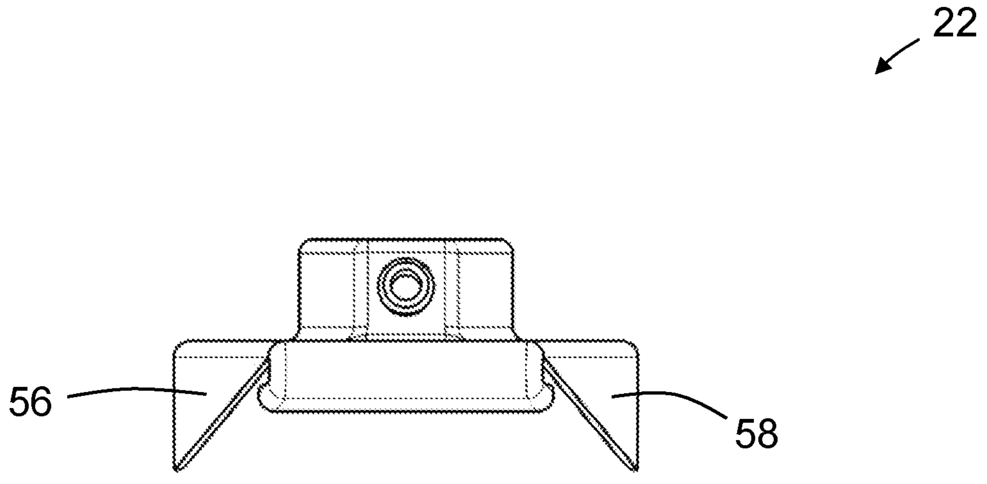
FIG. 11 is a top view of the irrigation dispenser of FIG. 7.
Figure 12:
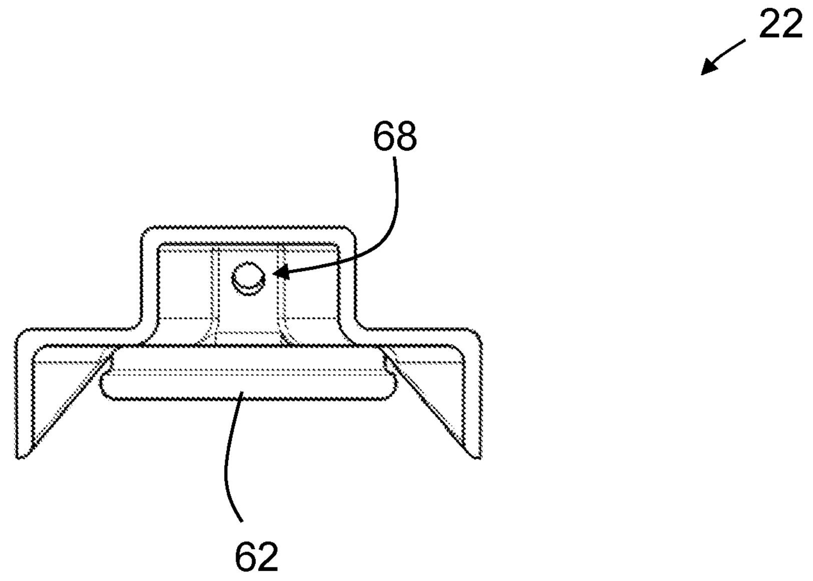
FIG. 12 is a bottom view of the irrigation dispenser of FIG. 7.

The irrigation dispenser 22 is configured to be installed on the container body 24 by engaging the hooked tab 62 onto an upper edge of either the first side wall 28 or the second side wall 32. Once installed, the tapered side walls 56 and 58 are configured to both abut the first side wall 28 (or the second side wall 32, if installed thereon) along their lengths, as shown in FIG. 6. The elongate rib 54, the front wall 52, and the tapered side walls 56 and 58 of the irrigation dispenser 22 together define, with the first side wall 28 (or the second side wall 32) of the container body 24, an enclosure 80 sized to accommodate a quantity or "charge" of irrigation fluid that is defined by the volume of the enclosure 80. In the example shown, the volume of the enclosure 80 is about four (4) fluid ounces. As can be seen for example in FIG. 6, the fluid passage 68 is in fluid communication with the enclosure 80.

The irrigation dispenser 22 is sized such that, when installed, the bottommost surface of the irrigation dispenser 22, which defines the perimeter of the discharge opening 70, is spaced above the floor 36 of the container body 24 by a minimum distance d. In the example shown, the value of d is about 0.14 inches (about 4 mm). As will be understood, positioning the opening 70 near the floor 36 of the container body 24 allows irrigation fluid to be delivered to the soil S surrounding the root tips R of the one or more plants P growing therein, and away from the top surface of soil S from which undesirable evaporation would otherwise occur. In the example shown, ratio A of the height of the irrigation dispenser 22 and the height h of the first or second side wall 28 or 32, namely $A=(h-d)/h$, is about 0.95. However, it will be understood that the irrigation dispenser 22 may alternatively be differently sized relative to the container body 24, and that the values of d and/or A may alternatively be different, provided that the bottommost surface of the irrigation dispenser 22 is spaced above the floor 36 of the container body 24, and provided that the irrigation fluid is still delivered to the soil S surrounding the root tips R, and away from the top surface of soil S.

In use, the plant container 20 is assembled by engaging the hooked tab 62 of the irrigation dispenser 22 onto the upper edge of either the first side wall 28 or the second side wall 32, such that the irrigation dispenser 22 is suspended therefrom. When the irrigation dispenser is installed in this manner, the irrigation dispenser 22 and the first side wall 28 (or the second side wall 32) of the container body 24 define the enclosure 80 sized to accommodate the volume of irrigation fluid. With the irrigation dispenser 22 installed, the interior of the container body 24 may be partially filled with soil S and one or more plants P (and/or one or more seeds, not shown, that will eventually grow into one or more plants P). During soil filling, the soil S is added such that the soil S fills a portion of the interior of the container body 24 around an exterior of the irrigation dispenser 22, but does not significantly enter through the discharge opening 70 into the enclosure 80, as shown in FIG. 2.

The plant container 20 is then installed on the vertical support surface (not shown) by engaging the longitudinal angled tab 38 of the container body 24 with the vertical support feature (not shown) mounted on the vertical support surface. The conduit C is connected to the nipple 66 of the irrigation dispenser 22, either before installation on the vertical support surface, or after.

To deliver irrigation fluid to the plant container 20, a distal end of the conduit C is connected to an irrigation fluid source (not shown), such as a portable pressurized water supply, a portable pressurized water-fertilizer solution supply, a water tap, and the like. A volume of irrigation fluid is then delivered through the conduit C into to the enclosure 70 of the irrigation dispenser 22. As the rate of fluid flow into the enclosure 80 is greater than the rate of fluid flow out the enclosure 80 via the discharge opening 70 into the surrounding soil S, the volume of irrigation fluid either fills or partially fills the enclosure 80, after which delivery of irrigation fluid through the conduit C is terminated. The irrigation fluid now in the enclosure 80 gradually flows out through the discharge opening 70 into the surrounding soil S, where it remains primarily near the floor 36 of the container body 24 and away from the top surface of the soil S. As the root tips R are located near the floor 36, the one or more plants P receive irrigation fluid, while evaporation of the irrigation fluid from the top surface of soil S is reduced.

As will be appreciated, the irrigation dispenser 22 is configured to deliver a quantity or "charge" of irrigation fluid that is defined by the volume of the enclosure 80 to the root tips R of the one or more plants P growing in the plant container 20. As will be understood, irrigating the root tips R of the one or more plants P with a "charge" of irrigation fluid that is defined by the volume of the enclosure 80 advantageously promotes a healthy environment for each plant P, as the plant only gets exactly what it needs and is therefore not over-irrigated, which would otherwise cause plant disease and infestation. Additionally, irrigating the root tips R of the one or more plants P with a "charge" of irrigation fluid that is defined by the volume of the enclosure 80 advantageously also enables use of a smaller volume of irrigation fluid (only four (4) fluid ounces in the example shown) by irrigating the root tips R of the one or more plants P directly, as opposed to irrigating the top of the one or more plants P which would otherwise require a much larger quantity of fluid (at least fifteen (15) fluid ounces, or more) to be able to reach the root tips R of the one or more plants P.

As will be appreciated, the irrigation dispenser 22 has a simple, one-piece construction that enables the enclosure 80 to be defined when the irrigation dispenser 22 is installed on either the first side wall 28 or the second side wall 32. When the irrigation dispenser 22 is installed in this manner, the space beneath the irrigation dispenser 22 (namely, between the discharge opening 70 and the floor 36 of the container body 24) is occupied by soil, which advantageously allows irrigation fluid to directly enter the soil S at the floor 36 of the container body 24.

As will be appreciated, the generally triangular shape of each of the first tapered side wall 56 and the second tapered side wall 58, and the existence of the elongate rib 54, increase the area of the discharge opening 70, relative to the size of the fluid passage 68. As will be appreciated, the large size of the discharge opening 70 advantageously reduces or eliminates the likelihood of the discharge opening 70 being clogged, such as by soil S, during use, as compared to conventional irrigation dispensers.

As will be appreciated, the elongate rib 54 of the irrigation dispenser 22 serves multiple purposes, as it is advantageously shaped to provide structural support to the irrigation dispenser 22 against pressure applied by the soil S, while also advantageously providing a cavity for accommodating irrigation fluid that forms part of the enclosure 80.

As will be appreciated, the irrigation dispenser 22 is configured such that it may be positioned on either the first side wall 28 or the second side wall 32 of the container body 24, which advantageously provides design versatility to the plant container 20. During use, when multiple plant containers 20 are arranged in an array during assembly of the vertical garden, each irrigation dispenser 22 may be independently installed in its respective container body 24, irrespective of the position of the irrigation dispenser 22 installed in a neighboring plant container 20, which allows the vertical garden to be assembled more easily than vertical gardens assembled from conventional plant containers. As will be understood, this versatility also advantageously allows the array of plant containers 20 to be altered, such as for example by adding, removing, or relocating one or more individual plant containers 20 within the array, in a facile manner and without having to disassemble and reassemble the entire array of plant containers 20. In contrast, vertical gardens comprising conventional plant containers having linked or stacked irrigation dispensers typically require disassembly and reassembly of the entire array of plant containers.

As will be appreciated, the hooked tab 62 of the irrigation dispenser 22 allows the portion of the irrigation dispenser 22 above the soil S to be secured to the container body 24. As will be understood, by securing the upper portion of the irrigation dispenser 22 to the container body 24, the likelihood of accidental displacement of the irrigation dispenser 22 during maintenance of the array of plant containers 20, which typically involves accidental pulling or tugging of the conduit C, is advantageously reduced or eliminated.

Variations are contemplated. For example, although in the embodiment described above, the plant container 24 comprises four (4) walls and a floor 36, in other embodiments, the plant container 24 may alternatively be cylindrically shaped, or generally cylindrically or "rounded-box" shaped, and therefore may alternatively have a single wall and a floor, with the irrigation dispenser 22 being installed on the single wall.

Although in the embodiment described above, the irrigation dispenser 22 comprises the nipple 66 configured to be connected to the conduit C, in other embodiments, the irrigation dispenser may alternatively have a receptacle at an upper end thereof sized to matingly receive an end of the conduit C, and having a fluid passage in fluid communication with the enclosure 80. The receptacle may, for example, have an inner diameter that is slightly smaller than an outer diameter of the conduit C for providing an interference fit between the receptacle and the conduit C.

Although in the embodiment described above, the container body 24 comprises a support feature in the form of a longitudinal angled tab 38 that extends the length of the rear wall 34, in other embodiments, the longitudinal angled tab 38 may alternatively not extend the full length of the rear wall. In still other embodiments, the support feature may alternatively be another suitable shape that enables the container body to engage the vertical support surface so that the plant container can be supported.

Although embodiments have been described above with reference to the accompanying drawings, those of skill in the art will appreciate that variations and modifications may be made without departing from the scope thereof as defined by the appended claims.

What is claimed is:

1. A plant container for a vertical garden, the plant container comprising:

a container body comprising at least one wall and a floor defining an interior configured to accommodate soil; and an irrigation dispenser removably suspended from an upper edge of the at least one wall, and when so suspended, the irrigation dispenser and the at least one wall define an enclosure sized to accommodate a volume of irrigation fluid, the irrigation dispenser having a bottommost surface spaced above the floor of the container body, wherein the irrigation dispenser comprises:

a front wall;

a central, elongate rib projecting forwardly from the front wall; and a first tapered side wall and a second tapered side wall each projecting rearwardly from a respective edge of the front wall, the front wall, the central, elongate rib and the first and second tapered side walls defining a portion of the enclosure configured to accommodate a volume of irrigation fluid, with the at least one wall of the container body defining another portion of the enclosure, wherein the bottommost surface defines a perimeter of a discharge opening of the irrigation dispenser, the perimeter of the discharge opening being a free end of the irrigation dispenser, the perimeter of the discharge opening being positioned directly in said interior configured to accommodate soil such that, in use, irrigation fluid is delivered directly to soil through the discharge opening.

2. The plant container of claim 1, wherein the irrigation dispenser comprises a hooked tab configured to engage the at least one wall.

3. The plant container of claim 2, wherein the hooked tab defines a channel along its length, the channel being sized to matingly receive the upper edge of the at least one wall.

4. The plant container of claim 1, wherein the irrigation dispenser comprises a connecting feature at an upper end thereof, the connecting feature being in fluid communication with the enclosure.

5. The plant container of claim 4, wherein the connecting feature is configured to connect to a conduit for delivery of irrigation fluid to the irrigation dispenser.

6. The plant container of claim 4, wherein the connecting feature is a nipple having a fluid passage formed therein.

7. The plant container of claim 4, wherein the connecting feature is a receptable sized to matingly receive an end of a conduit for delivery of irrigation fluid to the irrigation dispenser.

8. An irrigation dispenser for a plant container for a vertical garden, the irrigation dispenser comprising:

a front wall;

a central, elongate rib projecting forwardly from the front wall; and a first tapered side wall and a second tapered side wall each projecting rearwardly from a respective edge of the front wall, each of the first tapered side wall and the second tapered side wall defining a respective longitudinal edge configured to abut a wall of the plant container, wherein the irrigation dispenser is configured to be removably suspended from an upper edge of the wall of the plant container, and, when so suspended, the front wall, the central, elongate rib and the first and second tapered side walls define a portion of an enclosure configured to accommodate irrigation fluid, with the wall of the plant container defining another portion of the enclosure, wherein the irrigation dispenser has a bottommost surface defining a perimeter of a discharge opening, the perimeter of the discharge opening being a free end of the irrigation dispenser, the perimeter of the discharge opening being positioned directly in an interior of the plant container configured to accommodate soil such that, in use, irrigation fluid is delivered directly to soil through the discharge opening.

9. The irrigation dispenser of claim 8, further comprising a hooked tab defining a channel along its length.

10. The irrigation dispenser of claim 9, wherein the channel is sized to matingly receive an upper edge of a wall of the plant container.

11. The irrigation dispenser of claim 8, further comprising a connecting feature at an upper end of the irrigation dispenser, the connecting feature being in fluid communication with the portion of the enclosure.

12. The irrigation dispenser of claim 11, wherein the connecting feature is configured to connect to a conduit for delivery of irrigation fluid to the irrigation dispenser.

13. The irrigation dispenser of claim 11, wherein the connecting feature is a nipple having a fluid passage formed therein.

14. The irrigation dispenser of claim 11, wherein the connecting feature is a receptable sized to matingly receive an end of a conduit for delivery of irrigation fluid to the irrigation dispenser.

* * * * *